Figure 3:
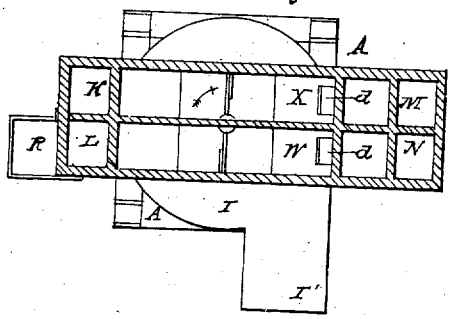
Figure 4:
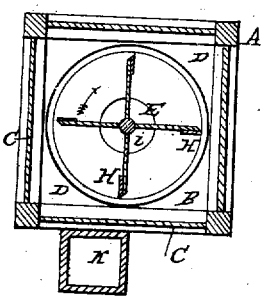
Figure 2:
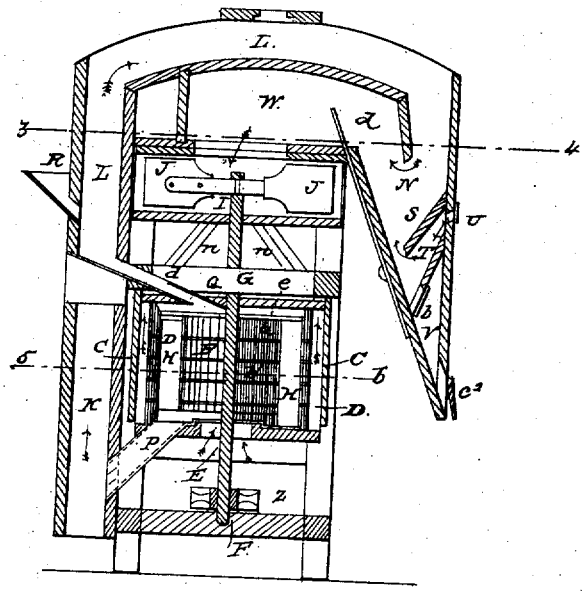
Figure 1:
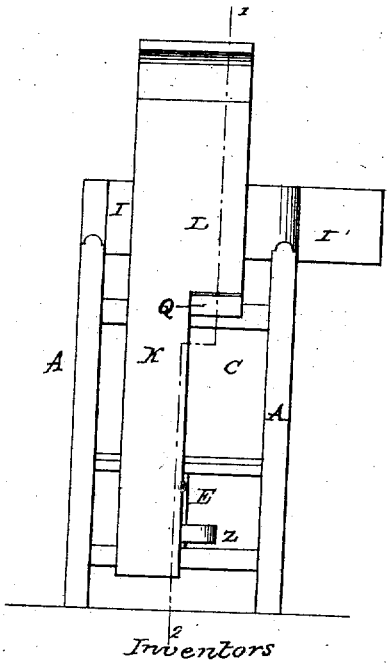

MONTGOMERY & HOWES.

Grain Separator.

No. 2,098.

Reissued Oct. 31, 1865.

Witnesses
F. Ransom
B. H. Muehle

Inventors
E. Montgomery
H. Montgomery
M. E. Montgomery
By E. B. & W. H. Forbush
attys.

N. PETERS, Photo-Lithographer, Washington, D. C.

UNITED STATES PATENT OFFICE.

EZEKIEL MONTGOMERY, HENRY MONTGOMERY, AND MARTIN E. MONTGOMERY, OF SILVER CREEK, NEW YORK, ASSIGNEES OF HENRY MONTGOMERY AND SIMEON HOWES.

IMPROVEMENT IN GRAIN-SEPARATORS.

Specification forming part of Letters Patent No. 23,039, dated February 22, 1859; Reissue No. 2,098, dated October 31, 1865.

*To all whom it may concern:*

Be it known that HENRY MONTGOMERY and SIMEON HOWES, of Silver Creek, in the county of Chautauqua and State of New York, heretofore invented certain new and useful Improvements in Grain-Separators, for which Letters Patent of the United States were issued to them on the 22d day of February, 1859, and which said Letters Patent are now deemed to be inoperative and invalid by reason of a defective and insufficient specification. Now, therefore, we, EZEKIEL MONTGOMERY, HENRY MONTGOMERY, and MARTIN E. MONTGOMERY, of Silver Creek, county of Chautauqua, and State of New York, assignees of the whole interest, right, and title of the said Letters Patent and invention, do hereby declare, pursuant to the statute in such case made and provided, that the following is a full and exact description of the said invention and improvements, reference being had to the accompanying drawings, making a part of this specification, in which—

Figure I is an end view. Fig. II is a vertical section on line 1 2 of Fig. I. Fig. III is a horizontal section on the line 3 4 of Fig. II. Fig. IV is a horizontal section on line 5 6 of Fig. II.

The nature of this invention relates to subjecting the light grain after it has been separated from the heavy grain and carried over into a utilizing-chamber to a counter-current of air, for the purpose of further cleaning the light grain and delivering it from the machine in a fit condition for feed.

Letters of like name and kind refer to like parts in each of the figures.

A represents a suitable frame-work, which supports a metallic scouring-cylinder, B, having vertical slots *b'*, of such width as will admit the passage of dust and dirt and retain the grain. Through the center of this cylinder a vertical shaft, E, passes, which is supported in its position by the step F and bearing G. Within the cylinder B, and attached by arms at the bottom and by a circular disk, *e*, at the top to the revolving shaft E, is a series of fan-beaters H. Upon the top of the frame A is placed a horizontal fan-case, I, within which, upon a prolongation of the shaft E, revolves a suction-fan, composed of any number of leaves, J, connected by arms to the shaft E.

Two arched flues extend side by side over the top of the machine. One of them, K, continues vertically down one side of the machine to near the bottom. The other, L, terminates on the same side at about the level of the bottom of the fan-case. These flues discharge on the opposite side into separate chambers, M and N, which are separated from each other by a continuation of the partition between the flues K and L. They are formed laterally by a continuation of the top covering of the flues and by an inclined board resting upon an angle of the fan-case, as shown in Fig. II. Within the cylinder B, and attached thereto, are several horizontal annular ribs, O.

An outlet-flue, P, extends from the bottom of the scouring-cylinder to the lower end of the flue K, and an outlet flue or passage, Q, extends from the bottom of the flue L into the upper end of the same cylinder. The flue Q is open on its upper side, as shown at *a*, for the admission of air into the flue to carry off the smut balls, chaff, &c., before the grain enters the scouring-cylinder.

A hopper, R, is placed upon the outside of the flue L to receive the grain, which passes from thence through an aperture into the said flue.

An inclined board, S, extends nearly across the chamber N. The light grain—such as are suitable for feed, which have been separated from the heavy or good quality of grain—is carried over through the flue K and discharged into the utilizing-chamber N. Here it is subjected to another or counter-current of air, which is admitted into the chamber through the aperture U. This current of air will remove whatever dust, chaff, or other foul stuff which may have been carried over with the light grain, so that the light grain is delivered from this chamber in a fit condition for feed.

Beneath the inclined board S is another inclined board, T, with an aperture closed by a hinged valve, *b*. At the lower angle of the casing, or at the bottom of the chamber, is an outlet, also furnished with a valve, $c^2$.

The above description of the chamber N and its appurtenances will suffice for the chamber M, as they are alike in size, form, and interior arrangement. A chamber, W, is separated from the chamber N by a slide, *d*. It is placed immediately above the fan case, and opens into it by a large aperture corresponding to a similar one in the top of the fan case. The chamber X is placed immediately above the fan-case, behind W, and is of the same form and size, and bears a similar relation to M that W does to N.

A driving-pulley, Z, is fixed upon the lower portion of the shaft E. Side boards, C, are attached to the posts of the frame A and extend nearly to the bottom of the cylinder, forming, in connection with top and bottom boards, an outer casing, D, which communicates by means of the tubes *n* with the fan-case.

Operation: The shaft E being put in motion in the proper direction, the fan produces powerful currents of air through the flues in the direction of the arrows. The grain to be cleaned is put into the hopper R and from thence passes across the flue L and into the spout Q, where it is met by a current of air which enters through the opening *a*, which opening may be adjusted by a slide or gate. This current takes out smut balls, chaff, dust, &c., and a portion of the light grains and carries them up the flue L. The heavy grain of good quality passes on through the spout Q to the rotating disk *e*, which distributes it equally by centrifugal force to the inner circumference of the scouring-cylinder B, where it is acted upon by the fan-beaters H, which fan-beaters, by their construction and rapid motion, draw in a current of air through the openings *i*, driving the dust which is disengaged from the grain through the slots in the cylinder into the outer casing, D, whence it is taken up by the draft through the tubes *n* into the fan-case and discharged therefrom through the spout I′, which spout may be continued into another apartment or through the outer wall of the building into the open air.

The annular ribs O perform an important function in retarding the passage of the grain through the cylinder and causing it to be exposed for a much longer time to the beaters and to the currents of air.

As the grain passes from the spout P into the flue K from the scouring-cylinder, it is met by another current of air passing up the flue K, which takes all the remaining light grain, chess, and other stuff and carries it up and over the top of the machine, letting it fall into the chamber N. In this chamber it is subjected to another current of air, which passes into the chamber through the opening U, which has the effect to thoroughly clean the light grain and render it in a fit condition for feed when it leaves the machine.

S is an inclined board placed in the chamber N to deflect to one side of the chamber.

T is also an inclined board placed below the board S and below the current of air. It has a valve, *b*, which is closed by the pressure of the atmosphere until a sufficient quantity of light grain, &c., has accumulated thereon to overcome the pressure of the atmosphere. It then opens and discharges into the next chamber, V. While the valve *b* is open the pressure of the atmosphere will keep the valve $C^2$ closed, which will discharge in turn when the weight overcomes the resistance. By this arrangement the strength of the draft in the flues is not much impaired by the opening of the valves for the discharge of the light grain.

The light grain, which is separated at its entrance into the machine, is carried up the flue L and subjected to the same influences as just described in reference to the light grain which is carried up the flue K. The strength of the draft in the flues L and K and in the chambers respectively connected therewith being susceptible to independent regulation, it is obvious that the mass can be separated into three distinct portions.

A current of air, regulated in intensity according to circumstances, entering into the utilizing-chamber N in a manner to meet the light grain in its descent, will carry the dust and chaff up and into the fan, from whence it is discharged.

The light and defective grain is thereby utilized for feed without any further trouble or expense.

Having thus fully described the said improvements, what we claim as the invention of the said HENRY MONTGOMERY and SIMEON HOWES, and desire to secure by these Letters Patent, is—

Subjecting the light grain after it has been separated from the heavy grain and carried over into the utilizing chambers to a counter-current of air, for the purpose of further cleaning the light grain and delivering it from the machine in a fit condition for feed, substantially as set forth.

EZEKIEL MONTGOMERY.
HENRY MONTGOMERY.
MARTIN E. MONTGOMERY.

Witnesses:
AMOS BOWEN,
CHARLES G. WARD.